US012664080B1

(12) United States Patent
Sun et al.

(10) Patent No.: US 12,664,080 B1
(45) Date of Patent: Jun. 23, 2026

(54) METHOD AND APPARATUS FOR PROCESSING RUNTIME FILE OF PCIE DEVICE, AND DEVICE

(71) Applicant: Suzhou MetaBrain Intelligent Technology Co., Ltd., Suzhou (CN)

(72) Inventors: Yongbo Sun, Suzhou (CN); Daotong Li, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/179,543

(22) Filed: Apr. 15, 2025

Related U.S. Application Data

(63) Continuation of application No. PCT/CN2024/079308, filed on Feb. 29, 2024.

(30) Foreign Application Priority Data

Jun. 27, 2023 (CN) .......................... 202310764797.1

(51) Int. Cl.
*G06F 12/02* (2006.01)
*G06F 13/42* (2006.01)
(52) U.S. Cl.
CPC ........ *G06F 12/023* (2013.01); *G06F 13/4282* (2013.01); *G06F 2212/1044* (2013.01); *G06F 2213/0026* (2013.01)
(58) Field of Classification Search
CPC .............. G06F 12/023; G06F 13/4282; G06F 2212/1044; G06F 2213/0026
See application file for complete search history.

(56) References Cited

U.S. PATENT DOCUMENTS

| | | | |
|---|---|---|---|
| 2018/0276008 A1 | 9/2018 | Zhao | |
| 2019/0087376 A1* | 3/2019 | Bolen | ................. G06F 13/4081 |
| 2020/0257541 A1* | 8/2020 | Jayakumar | .......... G06F 9/44505 |

(Continued)

FOREIGN PATENT DOCUMENTS

| | | |
|---|---|---|
| CN | 1464387 A | 12/2003 |
| CN | 1979416 A | 6/2007 |
| CN | 108021405 A | 5/2018 |

(Continued)

OTHER PUBLICATIONS

International Search Report of corresponding PCT application (PCT/CN2024/079308) Jun. 19, 2024 including English translation (7 pages).

(Continued)

*Primary Examiner* — Zhuo H Li
(74) *Attorney, Agent, or Firm* — Crowell & Moring LLP

(57) ABSTRACT

The present application relates to a method and apparatus for processing a runtime file of a PCIE device, and a device. A main technical solution includes: in response to a base input/output system loading a memory drive file of a PCIE device, acquiring identification number information of the PCIE device, determining whether the base input/output system has processed a historical PCIE device with a same model as the PCIE device according to the identification number information and pre-stored identification number information, to obtain a judgment result, and processing a runtime file in the memory drive file of the PCIE device according to the judgment result.

20 Claims, 4 Drawing Sheets

(56) References Cited

U.S. PATENT DOCUMENTS

2024/0220433 A1 * 7/2024 Cheng ................. G06F 12/0692
2025/0173158 A1 * 5/2025 Liu ....................... G06F 9/4411

FOREIGN PATENT DOCUMENTS

| CN | 112732345 | A | 4/2021 |
|----|-----------|---|--------|
| CN | 114116027 | A | 3/2022 |
| CN | 114860325 | A | 8/2022 |
| CN | 115080281 | A | 9/2022 |
| CN | 115328833 | A | 11/2022 |
| CN | 116126409 | A | 5/2023 |
| CN | 116541334 | A | 8/2023 |

OTHER PUBLICATIONS

Written Opinion of International Searching Authority of corresponding PCT application (PCT/CN2024/079308) Jun. 19, 2024 including English translation(10 pages).
Search report of corresponding CN priority application (CN202310764797.1) Aug. 7, 2023 (2 pages).
First Office Action of corresponding CN priority application (CN202310764797.1) Aug. 9, 2023 including English translation (9 pages).
Supplementary Search report of corresponding CN priority application (CN202310764797.1) Aug. 23, 2023 (2 pages).
Notification to Grant Patent Right for Invention of corresponding CN priority application (CN202310764797.1) Aug. 29, 2023 including English translation (2 pages).

* cited by examiner

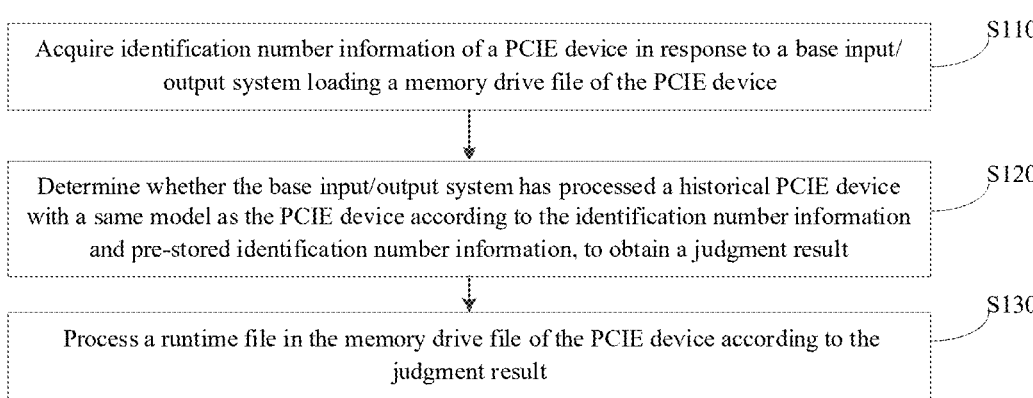

| Acquire identification number information of a PCIE device in response to a base input/output system loading a memory drive file of the PCIE device | S110 |

| Determine whether the base input/output system has processed a historical PCIE device with a same model as the PCIE device according to the identification number information and pre-stored identification number information, to obtain a judgment result | S120 |

| Process a runtime file in the memory drive file of the PCIE device according to the judgment result | S130 |

FIG. 1

| 0xExxxx | ...... |
|---|---|
| | Reserved space2n |
| | ...... |
| | Reserved space23 |
| | Reserved space22 |
| | Reserved space21 |
| | Reuse space2 |
| | Reserved space1n |
| | ...... |
| | Reserved space13 |
| | Reserved space12 |
| | Reserved space11 |
| 0xC8000 | Reuse space1 |

FIG. 2

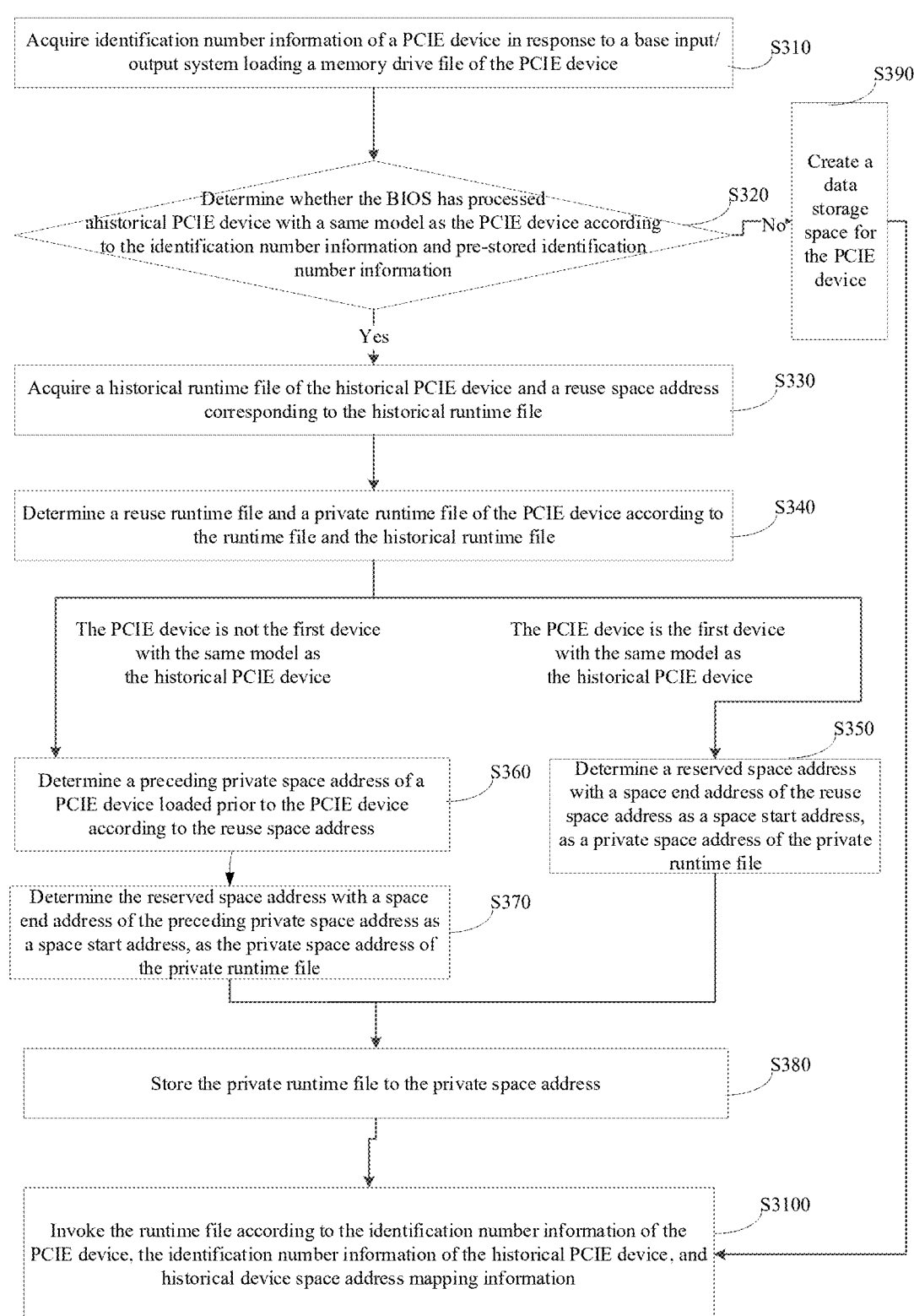

Acquire identification number information of a PCIE device in response to a base input/ output system loading a memory drive file of the PCIE device — S310

S390

Create a data storage space for the PCIE device

Determine whether the BIOS has processed a historical PCIE device with a same model as the PCIE device according to the identification number information and pre-stored identification number information — S320

No

Yes

Acquire a historical runtime file of the historical PCIE device and a reuse space address corresponding to the historical runtime file — S330

Determine a reuse runtime file and a private runtime file of the PCIE device according to the runtime file and the historical runtime file — S340

The PCIE device is not the first device with the same model as the historical PCIE device The PCIE device is the first device with the same model as the historical PCIE device

S350

Determine a preceding private space address of a PCIE device loaded prior to the PCIE device according to the reuse space address — S360

Determine a reserved space address with a space end address of the reuse space address as a space start address, as a private space address of the private runtime file Determine the reserved space address with a space end address of the preceding private space address as a space start address, as the private space address of the private runtime file — S370

Store the private runtime file to the private space address — S380

Invoke the runtime file according to the identification number information of the PCIE device, the identification number information of the historical PCIE device, and historical device space address mapping information — S3100

FIG. 3

METHOD AND APPARATUS FOR PROCESSING RUNTIME FILE OF PCIE DEVICE, AND DEVICE

CROSS-REFERENCE TO RELATED APPLICATION

This application is the national phase application of International Application No. PCT/CN2024/079308, filed Feb. 29 2024, which claims priority to Chinese Patent Application No. 2023107647971, filed on Jun. 27, 2023 in China National Intellectual Property Administration and entitled "Method and Apparatus for Processing Runtime File of PCIE Device, and Device", which is hereby incorporated by reference in its entirety. The contents of International Application No. PCT/CN2024/079308 and Chinese Patent Application No. 2023107647971 are incorporated herein by reference in their entireties.

FIELD

The present application relates to a method and apparatus for processing a runtime file of a peripheral component interconnect express (PCIE) device, and a device.

BACKGROUND

Under a traditional boot mode, i.e. a legacy boot mode of a basic input/output system (BIOS), the BIOS may load and initialize an option read-only memory (OpROM) drive file and an expansion read-only memory (expansion ROM) drive file of a peripheral component interconnect express (PCIE) device, and then allows a runtime file of the drive file to permanently reside in a memory space throughout system operation.

Under the legacy boot mode, each segment of a memory space address within a 1 megabyte (MB) has a dedicated purpose. Upon completion of processing the OpROM of the PCIE device by the BIOS, the runtime file may be permanently stored in a specified memory space. When the OpROM of a subsequent PCIE device is processed, the runtime file thereof is stacked above a memory address occupied by the runtime file of the preceding PCIE device. Due to the limited memory space, the number of the PCIE devices supported is inherently limited. The inventor has recognized that upon exhaustion of the allocated memory space, the OpROM of subsequent PCIE devices fails to be processed, resulting in abnormal operation of the PCIE devices.

SUMMARY

According to some embodiments of the present application, in a first aspect, provided is a method for processing a runtime file of a peripheral component interconnect express (PCIE) device. The method includes:

acquiring identification number information of a PCIE device in response to a base input/output system (BIOS) loading a memory drive file of the PCIE device;
  determining whether the BIOS has processed a historical PCIE device with a same model as the PCIE device according to the identification number information and pre-stored identification number information, to obtain a judgment result; and
  processing a runtime file in the memory drive file of the PCIE device according to the judgment result.

According to some embodiments of the present application, in a second aspect, provided is an apparatus for processing a runtime file of a PCIE device. The apparatus includes:

an acquisition module, configured to acquire identification number information of a PCIE device in response to a BIOS loading a memory drive file of the PCIE device;
  a determination module, configured to determine whether the BIOS has processed a PCIE device with a same model as the PCIE device according to the identification number information and pre-stored identification number information, to obtain a judgment result; and
  a processing module, configured to process a runtime file in the memory drive file of the PCIE device according to the judgment result.

According to some embodiments of the present application, in a third aspect, provided is a computer device, including:

at least one processor; and
  a memory in communication connection with the at least one processor, where
  the memory stores a computer instruction capable of being executed by the at least one processor, and the computer instruction is executed by the at least one processor to cause the at least one processor to execute the method involved in the first aspect.

According to some embodiments of the present application, in a fourth aspect, provided is a non-transitory computer-readable storage medium having a computer instruction stored therein, where the computer instruction is configured for causing a computer to execute the method involved in the first aspect.

BRIEF DESCRIPTION OF THE DRAWINGS

To describe the technical solutions of the embodiments of the present application more clearly, the accompanying drawings required for the embodiments are introduced briefly below. Apparently, the accompanying drawings in the following description show only some embodiments of the present application, and a person of ordinary skill in the art may still derive other accompanying drawings from these accompanying drawings without creative efforts.

FIG. 1 is a flowchart of a method for processing a runtime file of a peripheral component interconnect (PCIE) device in one or more embodiments;

FIG. 2 is a schematic diagram showing distribution of a reuse space and a reserved space in an address space in one or more embodiments;

FIG. 3 is a flowchart of a method for processing a runtime file of a PCIE device in one or more alternative embodiments;

DETAILED DESCRIPTION

The present application is further described in detail below in combination with the accompanying drawings and embodiments. It is to be understood that the specific embodiments described herein are only used to explain the present application, and not to limit the present application.

Figure 7:
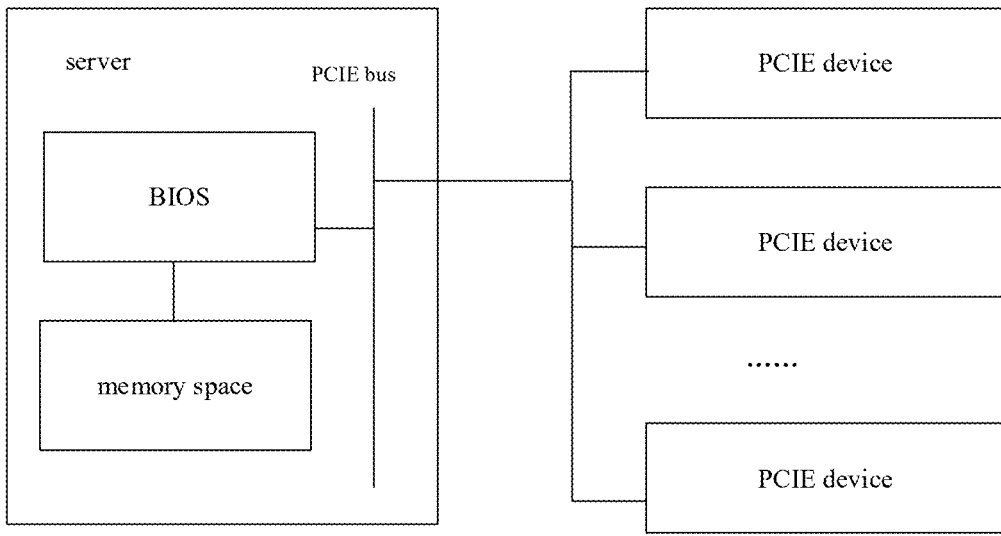
FIG. 7 is a schematic diagram of an application environment for a processing method of runtime files of a PCIE device in one or more embodiments.

In some embodiments, the processing method for runtime files of the PCIE device involved in the present application may be applied to the application environment shown in FIG. 7. FIG. 7 illustrates a schematic diagram of the application environment for the processing method of runtime files of the PCIE device in some embodiments.

As shown in FIG. 7, FIG. 7 illustrates an application environment diagram of a method for processing runtime files of a PCIE device in some embodiments. In the server boot architecture, the Basic Input/Output System (BIOS) in Legacy boot mode needs to manage interactions with peripheral components through a specific mechanism. When the server boots, the BIOS sequentially scans devices on the High-Speed Serial Computer Expansion Bus (PCIE) and loads the driver files from their Optional Read-Only Memory (Oprom/Option ROM) or Expansion Read-Only Memory (Expansion ROM). After these driver files are initialized by the BIOS, their runtime files are resident in the server memory space to provide continuous support for device functionality.

An option read-only memory (OpROM) refers to a read-only memory that is unnecessary to implement in a bus standard specification, which is optional. An expansion read-only memory (expansion ROM) is a read-only memory externally connected with a peripheral component interconnect express (PCIE) device. A runtime file is a device drive file describing software or an instruction executed during the running of a program, so as to ensure the normal operation of the device after an operating system is booted. Under a Legacy boot mode, each segment of a memory space address within 1 megabyte (MB) has a dedicated purpose. For example, an address spanning from 0xC0000 to 0xExxxx is reserved for storing a runtime file of an OpROM of a PCIE devices that resides permanently in a memory. In some embodiments, an address 0xC0000 is allocated to a runtime drive program file of a video graphics array (VGA) device, occupying a fixed size of 0x8000. Consequently, the remaining address space spanning from 0xC8000 to 0xExxxx, approximately over 100 kilobytes (KB), is available for all other PCIE devices. An address space spanning from 0xExxxx to 0xFFFFF has other dedicated purposes. Upon completion of processing the OpROM of a subsequent PCIE device, the runtime program file thereof is sequentially stacked at a memory address immediately following that allocated to the OpROM runtime program file of the preceding PCIE device. This iterative process continues in a cascading manner, where each newly processed runtime file of the PCIE device occupies a contiguous address space subsequent to that allocated to the preceding PCIE device.

Due to a limited memory space spanning from 0xC8000 to 0xExxxx, which is approximately 100 kilobytes (KB), and given that the persistent memory-resident portion of each PCIE device occupies a variable size ranging from several KB to tens of KB, the number of PCIE devices that might be supported is severely restricted. Once the address space is fully occupied, the OpROMs of the subsequent PCIE devices might not be processed, resulting in operational malfunctions of the unprocessed PCIE devices.

To solve the technical problems in the prior art, an embodiment of the present application provides a method and apparatus for processing a runtime file of a PCIE device, and a device. A method for processing a runtime file of a PCIE device provided by an embodiment of the present application is first described below.

FIG. 1 is a flowchart of a method for processing a runtime file of a PCIE device provided by an embodiment of the present application. As shown in FIG. 1, the method may include the following steps:

S110: acquiring identification number information of a PCIE device in response to a base input/output system (BIOS) loading a memory drive file of the PCIE device.

The identification number information is configured for judging a manufacturer and a model of the device, including a vendor identification number (ID), a device ID, a subsystem ID, and a subsystem vendor ID. Whether a plurality of devices are identical may be first determined by means of the vendor ID and the device ID. If the devices have the same vendor ID and device ID, whether the plurality of devices are identical may be further determined by the subsystem ID and the subsystem vendor ID. The plurality of devices with the same vendor ID and device ID may not be identical, and the further judgment is performed by means of the subsystem ID and the subsystem vendor ID, whereby the wrong judgment might be prevented effectively.

Under a legacy boot mode, after the BIOS loads an OpROM drive file of the PCIE device, a runtime file of the drive file resides permanently in a memory space. When the BIOS loads the memory drive file of the PCIE device, the identification number information of the PCIE device is acquired, to determine whether the BIOS has already processed the PCIE device with the same model as the current PCIE device.

S120: determining whether the BIOS has processed a historical PCIE device with a same model as the PCIE device according to the identification number information and pre-stored identification number information, to obtain a judgment result.

When loading the memory drive file of the PCIE device, the BIOS may record the identification number information of each loaded PCIE device, and the recorded information is the pre-stored identification number information. By matching the identification number information with pre-stored identification number information, judging whether the processed historical PCIE device with the same model as the PCIE device exists.

The judgment result includes that the historical PCIE device with the same model is already processed, and the historical PCIE device with the same model is unprocessed. When the identification number information successfully matches the pre-stored identification number information, it indicates that the BIOS has processed the historical PCIE device with the same model as the PCIE device. Then the judgment result is that the historical PCIE device with the same model is already processed. When the identification number information fails to match the pre-stored identification number information, it indicates that the BIOS has not processed the historical PCIE device with the same model as the PCIE device. Then the judgment result is that the historical PCIE device with the same model is unprocessed.

S130: processing a runtime file in the memory drive file of the PCIE device according to the judgment result.

The runtime file in the memory drive file of the PCIE device is stored and invoked according to the judgment result. For different judgment results, methods for storing and invoking the runtime file are different. When the judgment result is that the historical PCIE device with the same model is already processed, the PCIE device may reuse the runtime file shared with the historical PCIE device, and store a private runtime file of the PCIE device into a memory address space subsequent to a storage space in which the runtime file of the historical PCIE device is stored. When the judgment result is that the historical PCIE device with the same model is unprocessed, a storage space is created for the runtime file of the PCIE device. The runtime file is invoked according to a storage situation.

It may be seen that in the present embodiment of the present application, the identification number information of the PCIE device is acquired in response to the BIOS loading the memory drive file of the PCIE device, whether the BIOS has processed the historical PCIE device with the same model as the PCIE device is determined according to the identification number information and the pre-stored identification number information, to obtain the judgment result, and the runtime file in the memory drive file of the PCIE device is processed according to the judgment result. Therefore, the storage space of the runtime file might be reduced, the number of stored PCIE devices is increased, and the normal operation of the PCIE device might be guaranteed as far as possible.

The steps in the above method process are described in detail below. S130, i.e. "according to the judgment result, processing a runtime file in the memory drive file of the PCIE device" is first described in detail below in combination with embodiments.

As one or more implementations, S130 in some embodiments includes:

when the judgment result is that the historical PCIE device with the same model is already processed, acquiring a historical runtime file of the historical PCIE device and a reuse space address corresponding to the historical runtime file;

according to the runtime file and the historical runtime file, determining a reuse runtime file and a private runtime file of the PCIE device;

according to the reuse space address, determining a private space address of the private runtime file; and storing the private runtime file to the private space address.

When the judgment result is that the historical PCIE device with the same model is already processed, it is no longer to load all runtime files of the PCIE devices, but the runtime files of the historical PCIE devices with the same model as the PCIE device are reused. The historical runtime file is a runtime file of the historical PCIE device. When the memory drive file of the PCIE device is loaded, all historical runtime files may be reused, or some historical runtime files may be reused. A space address for storing the historical runtime files is a reuse space address.

The runtime file of the PCIE device that is identical to the historical runtime file is determined as the reuse runtime file of the PCIE device. A unique runtime file of the PCIE device relative to the historical runtime file is determined as the private runtime file of the PCIE device.

The space address of the reuse runtime file is a space address of the historical runtime file, i.e. the reuse space address. The private space address of the private runtime file is determined according to the reuse space address. The determination of the private space address is related to whether the PCIE device is a first device with the same model as the historical PCIE device.

In some embodiments, when the PCIE device is the first device with the same model as the historical PCIE device, a reserved space address with a space end address of the reuse space address as a space start address is determined as the private space address of the private runtime file.

As shown in FIG. 2, a reuse space 1 and a reuse space 2 are arranged in an address space spanning from 0xC8000 to 0xExxxx, where the reuse space 1 stores the historical runtime file of a historical PCIE device 1, and the reuse space 2 stores the historical runtime file of a historical PCIE device 2. A plurality of reserved spaces are set subsequent to the reuse space 1, including a reserved space 11, a reserved space 12, a reserved space 13, . . . , a reserved space In, and a plurality of reserved spaces are set subsequent to the reuse space 2, including a reserved space 21, a reserved space 22, a reserved space 23, . . . , a reserved space 2n. The reserved spaces are configured for storing the private runtime files of the PCIE devices with the same model as the historical PCIE device.

Taking the historical PCIE device being the historical PCIE device 1 as an example, when the PCIE device is the first device with the same model as the historical PCIE device 1, that is, there is no reserved space occupied by the private runtime file of any PCIE device, the private runtime file of the PCIE device is stored to the reserved space 11. When a shared address between the reuse space 1 and the reserved space 11 is a space end address of the reuse space address, the reserved space address with the space end address of the reuse space address as the space start address is determined as the private space address of the private runtime file, and the private runtime file is stored to the private space address.

When the PCIE device is not the first device with the same model as the historical PCIE device 1, a preceding private space address of a PCIE device loaded prior to the PCIE device is determined according to the reuse space address; and The reserved space address with the space end address of the preceding private space address as the space start address is determined as the private space address of the private runtime file.

When the PCIE device is not the first device with the same model as the historical PCIE device 1, that is, other PCIE devices with the same model as the historical PCIE device 1 are already loaded, the runtime files of these PCIE devices occupy the reserved space as the private space, whereby the private runtime file of the current PCIE device might only be stored subsequent to the private space of these PCIE devices. The private space address of the PCIE device loaded prior to the current PCIE device is determined as the preceding private space address, and the reserved space address with the space end address of the preceding private space address as a space start address is an address of a reserved space subsequent to the preceding private space. The address of the reserved space is the private space address of the private runtime file, and the private runtime file is stored to the private space address. For example, the preceding private space is the reserved space 13, the reserved space 14 is a private space storing the private runtime file of the PCIE device, and the address of the reserved space 14 is determined as the private space address.

By classifying the runtime files of the PCIE devices into the reuse runtime files and the private runtime files, only the private runtime files are re-stored, and the reuse runtime files are shared with the historical PCIE device, whereby the storage space for the reuse runtime file is greatly reduced, and the number of the PCIE devices storing the runtime files is increased.

There are various methods for determining the reserved space address. A plurality of reserved space addresses may be preset, or the reserved space address may be set correspondingly each time when the runtime file of the PCIE device is loaded.

In one or more implementations, when the PCIE device is the first device with the same model as the historical PCIE device, the method for determining the reserved space address includes:

after the private runtime file of the PCIE device is determined, acquiring a space end address of the historical runtime file;

setting a reserved space of the private runtime file subsequent to the space end address of the historical runtime file; and determining a reserved space address according to position information of the reserved space.

Since the PCIE device is the first device with the same model as the historical PCIE device, the reserved space is directly set in a reuse space of the historical runtime file. The space end address of the historical runtime file is acquired, the reserved space of the private runtime file is set subsequent to the space end address, and the reserved space may be set in a corresponding size such as 1 KB and 512 B according to an actual need. The reserved spaces in different sizes are also different in positions. The position information may include a start position address and an end position address. The reserved space address is obtained according to the position information of the reserved space.

In another or more implementations, when the PCIE device is not the first device with the same model as the historical PCIE device, the method for determining the reserved space address includes:

after the private runtime file of the PCIE device is determined, acquiring a space end address of the preceding private space address;

setting a reserved space of the private runtime file subsequent to the space end address of the preceding private space address; and determining the reserved space address according to position information of the reserved space.

Since the PCIE device is not the first device with the same model as the historical PCIE device, it is necessary to set the reserved space subsequent to the preceding private space of a PCIE device loaded prior to the PCIE device. The space end address of the preceding private space address is acquired, and the reserved space in a preset size is set subsequent to the space end address of the preceding private space address. The position information of the reserved space is acquired according to the size of the reserved space, and a reserved space address is obtained according to the position information of the reserved space.

The above two methods for determining the reserved space address are performed when the runtime file of the PCIE device is loaded, and the corresponding reserved space may be set according to the size of the private runtime file, thereby maximizing the utilization of the storage space.

In one or more implementations, the method for determining the reserved space address includes:

calculating a space volume of the historical runtime file upon completion of loading the historical runtime file of the historical PCIE device;

determining a space start address and a space end address of the historical runtime file according to the space volume of the historical runtime file;

setting at least one reserved space subsequent to the space end address of the historical runtime file; and determining the reserved space address according to the position information of the reserved space.

Upon completion of loading the historical runtime file of the historical PCIE device, the space volume of the historical runtime file is calculated by means of an algorithm provided in a PCIE specification, i.e., calculating the size of the historical runtime file. After the size of the historical runtime file is determined, the position of the reuse space of the historical runtime file is subsequently determined, whereby the space start address and the space end address of the historical runtime file may be known. At least one reserved space is set subsequent to the space end address of the historical runtime file. In order to satisfy the private runtime file of each PCIE device as far as possible, these reserved spaces are identical in size that may be greater than that of the reserved space set when the runtime file of the PCIE device is loaded. After the position of each reserved space is determined, a reserved space address is determined according to the position information of the reserved space.

By means of the above method, all PCIE devices with the same model share the space address of the same reuse runtime file. Moreover, the private runtime file of each PCIE device is stored in a small adjacent space, thereby greatly reducing the occupation of the address space spanning from 0xC8000 to 0xExxxx by the PCIE device with the same model. For example, one server is connected with 10 PCIE devices with the same model, each having a runtime file size of 20 KB. Each reserved space has a size of 1 KB, whereby a space size of 200 KB (20×10) is needed for storing the runtime file according to a conventional storage method, which is greater than the space of more than 100 KB spanning from 0xC8000 to 0xExxxx. However, by adopting the above method, the space size needed by the ten devices is 21 KB (20+1), which is far smaller than the space of 200 KB needed in the conventional storage method.

In one or more implementations, after storing the private runtime file to the private space address, the method further includes:

invoking a runtime file according to the identification number information of the PCIE device, the identification number information of the historical PCIE device, and historical device space address mapping information.

The identification number information of the historical PCIE device includes a vendor identification number (ID), a device ID, a subsystem vendor ID, and a subsystem ID of the historical PCIE device. The historical device space address mapping information includes the identification number information and reuse space address of the historical PCIE device, and there is a mapping relationship between the identification number information of each historical PCIE device and the corresponding reuse space address.

Since the runtime files of the PCIE device include the private runtime file and the reuse runtime file, different runtime files have different invoking methods. In some embodiments, the invoking a runtime file according to the identification number information of the PCIE device and the identification number information of the historical PCIE device includes:

when the identification number information of the PCIE device matches the identification number information of the historical PCIE device, invoking a reuse runtime file in the runtime files.

When the identification number information of the PCIE device matches the identification number information of the historical PCIE device, it indicates that the PCIE device and the historical PCIE device have the same model, and may share some runtime files, and the runtime files are the reuse runtime files in the runtime files of the PCIE device. When the reuse runtime file of the PCIE device needs to be invoked, the historical PCIE device with the same identification number information as the PCIE device is matched to find the historical runtime file, thereby invoking the reuse runtime file in the runtime files.

In addition, the reuse runtime file in the runtime files may also be invoked according to the identification number information of the PCIE device and the historical device space address mapping information.

Since the historical device space address mapping information stores a mapping relationship between the identification number information of each historical PCIE device and the corresponding reuse space address, the historical PCIE device matched with the current PCIE device may be found first according to the identification number information, and then the reuse space address of the historical runtime file is found according to the historical device space address mapping information, whereby the reuse runtime file in the runtime files may be invoked directly.

When the identification number information of the PCIE device successfully matches the identification number information of the historical PCIE device, it indicates that the PCIE device and the historical PCIE device have the same model, whereby the reuse space address is searched by means of the historical device space address mapping information, to directly invoke the reuse runtime file stored in the reuse space address.

In one or more implementations, for ease in searching the private runtime file of each PCIE device, a loading sequence value of the PCIE device in the historical PCIE device is recorded, where the loading sequence value corresponds to the reserved space.

The invoking a runtime file according to the identification number information of the PCIE device and the identification number information of the historical PCIE device includes:

acquiring the loading sequence value of the PCIE device in the historical PCIE device;

when the identification number information of the PCIE device successfully matches the identification number information of the historical PCIE device, determining the private space address of the PCIE device according to the loading sequence value; and invoking the private runtime file in the runtime files according to the private space address of the PCIE device.

When the identification number information of the PCIE device successfully matches the identification number information of the historical PCIE device, it indicates that the PCIE device and the historical PCIE device have the same model, and the private runtime file of the PCIE device is stored in the reserved space of the reuse space in which the historical PCIE device is located. The loading sequence value of the PCIE device in the historical PCIE device is acquired, the reserved space storing the private runtime file is searched by means of the loading sequence value, and the space address of the reserved space is acquired, i.e. the private space address of the PCIE device. The private runtime file is found by means of the private space address, and invoked.

In one or more implementations, S130 further includes:

When the judgment result is that the historical PCIE device with the same model is unprocessed, creating a data storage space for the PCIE device, to store the runtime file.

When the judgment result is that the historical PCIE device with the same model is unprocessed, it indicates that no runtime file that may be shared by the PCIE device is stored in the data storage region, whereby it is necessary to store all runtime files of the PCIE device. When a reuse space in which the data is stored is found in the data storage region, the last reuse space in which the data is stored is determined according to an arrangement sequence, and the data storage space for the PCIE device is created subsequent to the last reserved space of the reuse space, so as to store the runtime file.

In one or more implementations, S120 includes:

When the identification number information coincides with the pre-stored identification number information, determining that the BIOS has already processed the historical PCIE device with the same model as the PCIE device.

The coincidence between the identification number information and the pre-stored identification number information may include complete coincidence and partial coincidence. When the identification number information completely coincides with the pre-stored identification number information, the PCIE device necessarily has the same model as the historical PCIE device. For the partial coincidence, an identification number representing a device identity may be determined according to actual needs, and as long as these identification numbers have coincidence, it may be determined that the PCIE device has the same model as the historical PCIE device.

When the identification number information does not coincide with the pre-stored identification number information, it is determined that the BIOS does not process the historical PCIE device with the same model as the PCIE device.

Correspondingly, the non-coincidence between the identification number information and the pre-stored identification number information may include complete non-coincidence and partial non-coincidence. When the identification number information exhibits complete non-coincidence with the pre-stored identification number information, it is conclusively determined that the PCIE device does not have the same model as the historical PCIE device. For the partial non-coincidence, an identification number representing a device identity may be determined according to actual needs, and as long as any of these identification numbers does not coincide with other identification numbers, it may be determined that the PCIE device does not have the same model as the historical PCIE device.

In one or more implementations, prior to the acquiring the identification number information of the PCIE device, the method further includes:

storing the identification number information of the PCIE device by defining a data structure; or accessing a storage chip by the BIOS, and writing the identification number information of the PCIE device into the storage chip, to store the identification number information of the PCIE device.

The identification number information of the PCIE device may be stored by defining the data structure by using a pointer, a linked list, an array, or the like. Alternatively, the storage chip such as an electrically erasable programmable read-only memory (EEPROM) may be accessed by using the BIOS, and the identification number information of the PCIE device is written into the storage chip. The stored identification number information is the pre-stored identification number information serving as a basis for judging whether the subsequently-loaded devices have the same model. The identification number information of the newly loaded PCIE device is stored continuously, whereby a database of the pre-stored identification number information may be updated, which is beneficial to more accurately judging whether there is the device with the same model.

According to the implementations of the above embodiments, one or more alternative method processes provided in the present embodiment of the present application are described with examples with reference to FIG. 3. As shown in FIG. 3, the method may include the following steps:

S310: acquiring identification number information of a PCIE device in response to a BIOS loading a memory drive file of the PCIE device.

S320: Determining whether the BIOS has processed a historical PCIE device with a same model as the PCIE device according to the identification number information and pre-stored identification number information; if so, performing S330; and if not, performing S390.

S330: acquiring a historical runtime file of the historical PCIE device and a reuse space address corresponding to the historical runtime file.

S340: determining a reuse runtime file and private runtime file of the PCIE device according to the runtime file and the historical runtime file;

when the PCIE device is the first device with the same model as the historical PCIE device, performing S350; and when the PCIE device is not the first device with the same model as the historical PCIE device, performing S360.

S350: determining a reserved space address with a space end address of the reuse space address as a space start address, as a private space address of the private runtime file.

S360: determining a preceding private space address of a PCIE device loaded prior to the PCIE device according to the reuse space address.

S370: determining a reserved space address with a space end address of the preceding private space address as a space start address, as the private space address of the private runtime file.

S380: storing the private runtime file to the private space address.

S390: creating a data storage space for the PCIE device.

S3100: invoking a runtime file according to the identification number information of the PCIE device, the identification number information of the historical PCIE device, and historical device space address mapping information.

The method for processing the runtime file of the PCIE device shown in FIG. 3 achieves same technical effects as the method shown in FIG. 1, whereby details are not described again herein.

It should be understood that although each step in the flowcharts of FIG. 1 and FIG. 3 is shown by the sequence as indicated by the arrow, these steps are not necessarily executed in the sequence as indicated by the arrow. Unless explicitly stated in the present application, the execution of these operations is not strictly limited in sequence, and these operations may be executed in other sequences. Moreover, at least some steps in FIG. 1 and FIG. 3 may include a plurality of sub-steps or phases, which are not necessarily executed at the same time, but may be executed at different moments, and the execution sequence of these sub-steps or phases is not necessarily sequential, but may be alternately executed with other steps or at least some sub-steps or phases of other steps.

Figure 4:
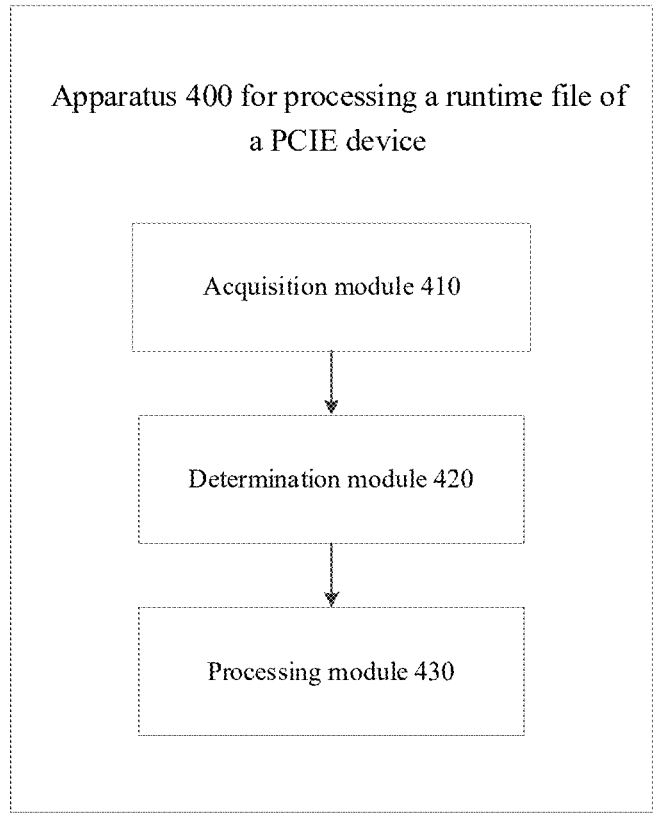
FIG. 4 is a block diagram of an apparatus for processing a runtime file of a PCIE device in one or more embodiments.

FIG. 4 is a schematic structural diagram of an apparatus for processing a runtime file of a PCIE device provided by an embodiment of the present application. The apparatus is configured to execute method processes shown in FIG. 1 or FIG. 3. As shown in FIG. 4, the apparatus may include: an acquisition module 410, a determination module 420, and a processing module 430, and may further include: an invoking module, a recording module, and a storage module. Primary functions of each constituent module are as follows:

The acquisition module 410 is configured to acquire identification number information of a PCIE device in response to a BIOS loading a memory drive file of the PCIE device;

The determination module 420 is configured to determine whether the BIOS has processed a PCIE device with a same model as the PCIE device according to the identification number information and pre-stored identification number information, to obtain a judgment result;

The processing module 430 is configured to process a runtime file in the memory drive file of the PCIE device according to the judgment result.

In one or more implementations, the processing module 430 is in some embodiments configured to acquire a historical runtime file of the historical PCIE device and a reuse space address corresponding to the historical runtime file when the judgment result is that the historical PCIE device with the same model is already processed, determine a reuse runtime file and a private runtime file of the PCIE device according to the runtime file and the historical runtime file, determine a private space address of the private runtime file according to the reuse space address, and store the private runtime file to the private space address.

In one or more implementations, the processing module 430 is in some embodiments configured to determine a reserved space address with a space end address of the reuse space address as a space start address, as the private space address of the private runtime file when the PCIE device is the first device with the same model as the historical PCIE device.

In one or more implementations, the determination module 420 is further configured to acquire a space end address of the historical runtime file after the private runtime file of the PCIE device is determined, set a reserved space of the private runtime file subsequent to the space end address of the historical runtime file, and determine the reserved space address according to position information of the reserved space.

In one or more implementations, the processing module 430 is in some embodiments configured to determine a preceding private space address of a PCIE device loaded prior to the PCIE device according to the reuse space address when the PCIE device is not the first device with the same model as the historical PCIE device, and determine the reserved space address with a space end address of the preceding private space address as a space start address, as the private space address of the private runtime file.

In one or more implementations, the determination module 420 is further configured to acquire a space end address of the preceding private space address after the private runtime file of the PCIE device is determined, set a reserved space of the private runtime file subsequent to the space end address of the preceding private space address, and determine the reserved space address according to position information of the reserved space.

In one or more implementations, the determination module 420 is further configured to calculate a space volume of the historical runtime file upon completion of loading the historical runtime file of the historical PCIE device, determine a space start address and a space end address of the historical runtime file according to the space volume of the historical runtime file, set at least one reserved space subsequent to the space end address of the historical runtime file; and determine the reserved space address according to the position information of the reserved space.

In one or more implementations, the apparatus further includes the invoking module configured to invoke a runtime file according to the identification number information of the PCIE device, the identification number information of the historical PCIE device, and historical device space address mapping information.

In one or more implementations, the invoking module is in some embodiments configured to invoke a reuse runtime file in the runtime files when the identification number information of the PCIE device matches the identification number information of the historical PCIE device.

In one or more implementations, the historical device space address mapping information includes the identification number information and reuse space address of the historical PCIE device; and the invoking module is in some embodiments configured to invoke the reuse runtime file in the runtime files according to the reuse space address of the historical PCIE device when the identification number information of the PCIE device successfully matches the identification number information of the historical PCIE device.

In one or more implementations, the apparatus further includes the recording module configured to record a loading sequence value of the PCIE device in the historical PCIE device.

In one or more implementations, the invoking module is in some embodiments configured to acquire the loading sequence value of the PCIE device in the historical PCIE device, determine the private space address of the PCIE device according to the loading sequence value when the identification number information of the PCIE device successfully matches the identification number information of the historical PCIE device, and invoke the private runtime file in the runtime files according to the private space address of the PCIE device.

In one or more implementations, the processing module 430 is in some embodiments configured to create a data storage space for the PCIE device to store the runtime file when the judgment result is that the historical PCIE device with the same model is unprocessed.

In one or more implementations, the determination module 420 is in some embodiments configured to determine that the BIOS has already processed the historical PCIE device with the same model as the PCIE device when the identification number information coincides with the pre-stored identification number information.

In one or more implementations, the determination module 420 is in some embodiments configured to determine that the BIOS does not process the historical PCIE device with the same model as the PCIE device when the identification number information does not coincide with the pre-stored identification number information.

In one or more implementations, the apparatus further includes the storage module configured to store the identification number information of the PCIE device by defining a data structure; or access a storage chip by means of the BIOS, and write the identification number information of the PCIE device into the storage chip, to store the identification number information of the PCIE device.

The identification number information includes a vendor ID, a device ID, a subsystem vendor ID, and a subsystem ID.

Identical or similar parts among the various aforementioned embodiments may be cross-referenced, with each embodiment emphasizing the differences from the other embodiments. Particularly, since the apparatus embodiments are substantially similar to the method embodiments, the description is relatively concise, and relevant details might be referred to in the corresponding sections of the method embodiments.

According to an embodiment of the present application, the present application further provides a computer device, and a computer-readable storage medium.

Figure 5:
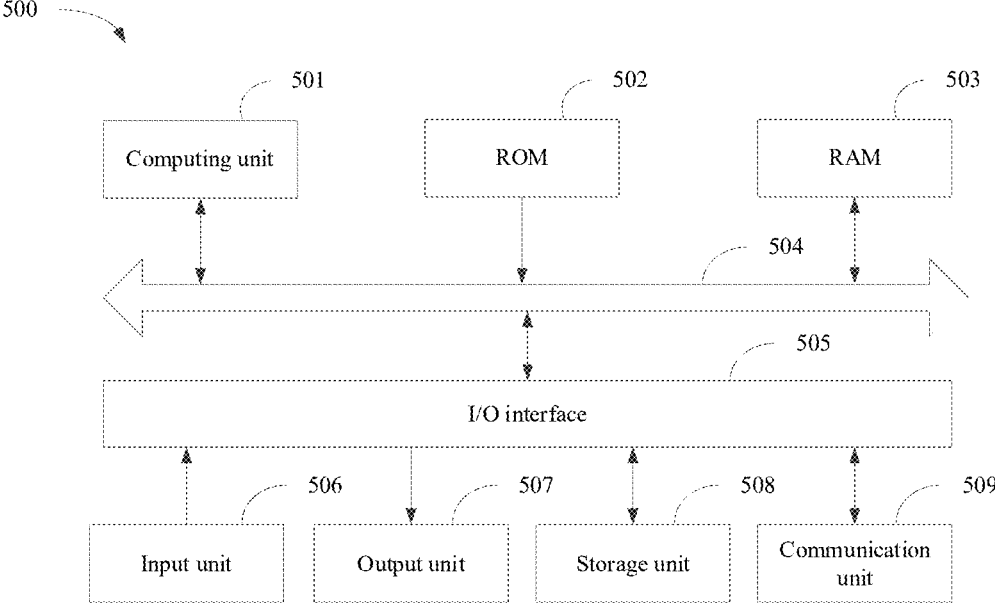
FIG. 5 is a schematic structural diagram of a computer device in one or more embodiments.
Figure 6:
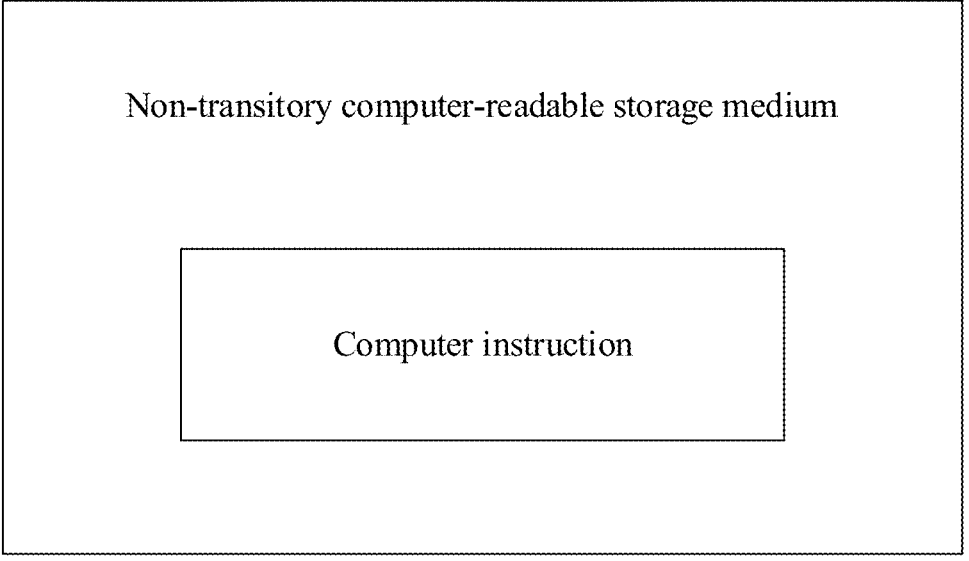
FIG. 6 is a schematic structural diagram of a storage medium in one or more embodiments.

As shown in FIG. 5, FIG. 5 a block diagram of a computer device according to an embodiment of the present application. The computer device is intended to denote various forms of digital computers or mobile devices. The digital computers may include desktop computers, portable computers, workstations, personal digital assistants, servers, mainframe computers, and other suitable computers. The mobile devices may include tablet computers, smart phones, wearable devices, or the like.

As shown in FIG. 5, a device 500 includes a computing unit 501, a read-only memory (ROM) 502, a random access memory (RAM) 503, a bus 504, and an input/output (I/O) interface 505, where the computing unit 501, the ROM 502, and the RAM 503 are connected to each other by means of the bus 504. The input/output (I/O) interface 505 is also connected to the bus 504.

The computing unit 501 may execute various processing in the method embodiments of the present application according to a computer instruction stored in the ROM 502 or the computer instruction loaded into the RAM 503 from a storage unit 508. The computing unit 501 may be various universal and/or dedicated processing components with processing and computing capacity. The computing unit 501 may include, but is not limited to a central processing unit (CPU), a graphics processing unit (GPU), various dedicated artificial intelligence (AI) computing chips, various computing units operating a machine learning model algorithm, a digital signal processor (DSP), and any suitable processor, controller, and micro-controller, or the like. In some embodiments, the method provided in the present embodiment of the present application may be implemented as a computer software program, and is tangibly included in a computer-readable storage medium such as the storage unit 508.

The RAM 503 may further store various programs and data required for the operation of the device 500. Some or all of the computer programs may be loaded and/or installed to the device 500 via the ROM 802 and/or a communication unit 509.

An input unit 506, an output unit 507, the storage unit 508, and the communication unit 509 in the device 500 may be connected to the I/O interface 505. The input unit 506 may be a keyboard, a mouse, a touch screen, a microphone, or the like; and the output unit 507 may be a display device, a loudspeaker, an indicator light, or the like. The device 500 might exchange information and data with other devices by means of the communication unit 509.

It needs to be stated that the device may include other necessary components required for normal operation. The device may also only include the necessary components for implementing the solutions of the present application, and unnecessarily include all components shown in the drawings.

Various embodiments of the systems and technologies described herein may be implemented in digital electronic circuit systems, integrated circuit systems, field programmable gate arrays (FPGA), application specific integrated circuits (ASIC), application specific standard products (ASSP), system-on-a-chip (SOC), load programmable logic devices (CPLD), computer hardware, firmware, software and/or combinations thereof.

Computer instructions for implementing the methods of the present application may be written in any combination of one or more programming languages. These computer instructions may be provided to the computing unit 501, whereby the computer instructions, when executed by the computing unit 501 such as a processor, cause the steps involved in the method embodiment of the present application to be executed.

A computer-readable storage medium provided by the present application may be a tangible medium, which may include or store computer instructions to execute the steps involved in the method embodiment of the present application. The computer-readable storage medium may include, but is not limited to, storage media in electronic, magnetic, optical, electromagnetic and other forms.

The above embodiments do not constitute limitations to the protection scope of the present application. It should be understood by those skilled in the art that various modifications, combinations, sub-combinations, and substitutions may be made according to design requirements and other factors. Any modifications, equivalent substitution and improvements made within the spirit and principle of the present application shall be contained within the protection scope of the present application.

What is claimed is:

1. A method for processing a runtime file of a peripheral component interconnect express (PCIE) device, comprising:
   acquiring identification number information of the PCIE device in response to a base input/output system (BIOS) loading a memory drive file of the PCIE device;
   determining whether the BIOS has processed a historical PCIE device with a same model as the PCIE device according to the identification number information and pre-stored identification number information, to obtain a judgment result; and
   processing a runtime file in the memory drive file of the PCIE device according to the judgment result;
   wherein the judgment result comprises that the historical PCIE device with the same model is already processed; and the processing a runtime file in the memory drive file of the PCIE device according to the judgment result comprises:
   acquiring a historical runtime file of the historical PCIE device and a reuse space address corresponding to the historical runtime file when the judgment result is that the historical PCIE device with the same model is already processed;
   determining a reuse runtime file and a private runtime file of the PCIE device according to the runtime file and the historical runtime file;
   determining a private space address of the private runtime file according to the reuse space address; and
   storing the private runtime file to the private space address.

2. The method according to claim 1, wherein the reuse space address comprises a space end address; and the determining the private space address of the private runtime file according to the reuse space address comprises:
   determining a reserved space address with the space end address of the reuse space address as a space start address, as the private space address of the private runtime file when the PCIE device is a first device with the same model as the historical PCIE device.

3. The method according to claim 2, wherein the determining the reserved space address comprises:
   acquiring the space end address of the historical runtime file after the private runtime file of the PCIE device is determined;
   setting a reserved space of the private runtime file subsequent to the space end address of the historical runtime file; and
   determining the reserved space address according to position information of the reserved space.

4. The method according to claim 3, wherein the determining the reserved space address further comprises:
   calculating a space volume of the historical runtime file upon completion of loading the historical runtime file of the historical PCIE device;
   determining a space start address and a space end address of the historical runtime file according to the space volume of the historical runtime file;
   setting at least one reserved space subsequent to the space end address of the historical runtime file; and
   determining the reserved space address according to position information of the reserved space.

5. The method according to claim 2, further comprising:
   determining a preceding private space address of another PCIE device loaded prior to the PCIE device according to the reuse space address when the PCIE device is not the first device with the same model as the historical PCIE device; and
   determining a reserved space address with a space end address of the preceding private space address as a space start address, as the private space address of the private runtime file.

6. The method according to claim 5, wherein the determining the reserved space address with a space end address of the preceding private space address as a space start address comprises:
   acquiring the space end address of the preceding private space address after the private runtime file of the PCIE device is determined;
   setting a reserved space of the private runtime file subsequent to the space end address of the preceding private space address; and
   determining the reserved space address according to position information of the reserved space.

7. The method according to claim 1, wherein after storing the private runtime file to the private space address, the method further comprises:
   invoking the runtime file according to the identification number information of the PCIE device, identification number information of the historical PCIE device, and historical device space address mapping information.

8. The method according to claim 7, wherein the invoking the runtime file according to the identification number information of the PCIE device and identification number information of the historical PCIE device comprises:
   invoking a reuse runtime file in the runtime files when the identification number information of the PCIE device matches the identification number information of the historical PCIE device.

9. The method according to claim 7, wherein the historical device space address mapping information comprises the identification number information and the reuse space address of the historical PCIE device; and the invoking the runtime file according to the identification number information of the PCIE device and historical device space address mapping information comprises:

invoking a reuse runtime file in the runtime files according to the reuse space address of the historical PCIE device when the identification number information of the PCIE device successfully matches the identification number information of the historical PCIE device.

10. The method according to claim 7, further comprising:

recording a loading sequence value of the PCIE device in the historical PCIE device.

11. The method according to claim 10, wherein the invoking the runtime file according to the identification number information of the PCIE device and identification number information of the historical PCIE device comprises:

acquiring the loading sequence value of the PCIE device in the historical PCIE device;

determining a private space address of the PCIE device according to the loading sequence value when the identification number information of the PCIE device successfully matches the identification number information of the historical PCIE device; and invoking a private runtime file in the runtime files according to the private space address of the PCIE device.

12. The method according to claim 1, wherein the judgment result comprises that the historical PCIE device with the same model is unprocessed; and the processing a runtime file in the memory drive file of the PCIE device according to the judgment result comprises:

creating a data storage space for the PCIE device to store the runtime file when the judgment result is that the historical PCIE device with the same model is unprocessed.

13. The method according to claim 1, wherein the determining whether the BIOS has processed the historical PCIE device with the same model as the PCIE device according to the identification number information and pre-stored identification number information comprises:

determining that the BIOS has processed the historical PCIE device with the same model as the PCIE device when the identification number information coincides with the pre-stored identification number information.

14. The method according to claim 13, further comprising:

determining that the BIOS does not process the historical PCIE device with the same model as the PCIE device when the identification number information does not coincide with the pre-stored identification number information.

15. The method according to claim 13, wherein the determining that the BIOS has processed the historical PCIE device with the same model as the PCIE device when the identification number information coincides with the pre-stored identification number information comprises:

in response to an identification number portion of the identification number information coincides with the pre-stored identification number information, determining that the BIOS has processed the historical PCIE device with the same model as the PCIE device.

16. The method according to claim 15, wherein the method further comprises:

in response to the identification number portion of the identification number information not coinciding with the pre-stored identification number information, determining that the BIOS does not process the historical PCIE device with the same model as the PCIE device.

17. The method according to claim 1, wherein after acquiring identification number information of the PCIE device, the method further comprises:

storing the identification number information of the PCIE device by defining a data structure; or accessing a storage chip by the BIOS, and writing the identification number information of the PCIE device into the storage chip, to store the identification number information of the PCIE device.

18. The method according to claim 1, wherein the identification number information comprises a vendor identification number (ID), a device ID, a subsystem vendor ID, and a subsystem ID.

19. A computer device, comprising:

a memory storing a computer instruction;

at least one processor configured to execute the computer instruction, wherein upon executing the computer instructions, the at least one processor is configured to:

acquire identification number information of a peripheral component interconnect express (PCIE) device in response to a base input/output system (BIOS) loading a memory drive file of the PCIE device;

determine whether the BIOS has processed a historical PCIE device with a same model as the PCIE device according to the identification number information and pre-stored identification number information, to obtain a judgment result; and process a runtime file in the memory drive file of the PCIE device according to the judgment result;

wherein the judgment result comprises that the historical PCIE device with the same model is already processed, and wherein in order to process the runtime file in the memory drive file of the PCIE device according to the judgment result, the at least one processor, upon execution of the computer instructions, is configured to:

acquire a historical runtime file of the historical PCIE device and a reuse space address corresponding to the historical runtime file when the judgment result is that the historical PCIE device with the same model is already processed;

determine a reuse runtime file and a private runtime file of the PCIE device according to the runtime file and the historical runtime file;

determine a private space address of the private runtime file according to the reuse space address; and store the private runtime file to the private space address.

20. A non-transitory computer-readable storage medium having a computer instruction stored therein, wherein the computer instruction, when executed by at least one processor, is configured to cause the at least one processor to:

acquire identification number information of a peripheral component interconnect express (PCIE) device in response to a base input/output system (BIOS) loading a memory drive file of the PCIE device;

determine whether the BIOS has processed a historical PCIE device with a same model as the PCIE device according to the identification number information and pre-stored identification number information, to obtain a judgment result; and process a runtime file in the memory drive file of the PCIE device according to the judgment result;

wherein the judgment result comprises that the historical PCIE device with the same model is already processed; and wherein in order to cause the at least one processor to process the runtime file in the memory drive file of the PCIE device according to the judgment result, the computer instruction, when executed by the at least one processor, is configured to cause the at least one processor to:

acquire a historical runtime file of the historical PCIE device and a reuse space address corresponding to the historical runtime file when the judgment result is that the historical PCIE device with the same model is already processed;

determine a reuse runtime file and a private runtime file of the PCIE device according to the runtime file and the historical runtime file;

determine a private space address of the private runtime file according to the reuse space address; and store the private runtime file to the private space address.

* * * * *